(12) United States Patent
Her (10) Patent No.: US 8,974,653 B2
(45) Date of Patent: Mar. 10, 2015

(54) SHOWER WITH IONIZATION APPARATUS

(76) Inventor: Sung-Yeol Her, Seoul (KR)

(*) Notice: Subject to any disclaimer, the term of this patent is extended or adjusted under 35 U.S.C. 154(b) by 0 days.

(21) Appl. No.: 13/128,379

(22) PCT Filed: Jul. 5, 2010

(86) PCT No.: PCT/KR2010/004347
§ 371 (c)(1),
(2), (4) Date: May 9, 2011

(87) PCT Pub. No.: WO2011/115329
PCT Pub. Date: Sep. 22, 2011

(65) Prior Publication Data
US 2013/0001085 A1      Jan. 3, 2013

(30) Foreign Application Priority Data

Mar. 16, 2010   (KR) .................. 10-2010-0023452

(51) Int. Cl.
*B05B 1/18*      (2006.01)
*C02F 1/48*      (2006.01)
*B05B 1/30*      (2006.01)
*E03C 1/04*      (2006.01)
(Continued)

(52) U.S. Cl.
CPC . *C02F 1/481* (2013.01); *B05B 1/18* (2013.01); *B05B 1/3026* (2013.01); *C02F 2307/06* (2013.01); *E03C 1/0409* (2013.01); *E03C 2201/40* (2013.01); *F16K 1/221* (2013.01); *F16K 1/222* (2013.01); *F16K 31/535* (2013.01)
USPC ............................ 204/664; 204/557; 239/525

(58) Field of Classification Search
CPC ............ C02F 1/48; C02F 1/481; C02F 1/482; C02F 2307/06; B05B 1/18; E03C 2201/40

USPC .......... 204/554–573, 660–674, 248; 210/222, 210/223, 695; 222/190, 554–563, 469–474; 239/378, 525
See application file for complete search history.

(56) References Cited

U.S. PATENT DOCUMENTS 4,265,754 A * 5/1981 Menold .................. 204/664
4,458,153 A * 7/1984 Wesley .................. 250/435
(Continued)

FOREIGN PATENT DOCUMENTS

KR    10-1998-0035598 A    8/1998
KR       20-0152627 Y1     7/1999
(Continued)

*Primary Examiner* — Harry D Wilkins, III
*Assistant Examiner* — Ciel Thomas
(74) *Attorney, Agent, or Firm* — Novick, Kim & Lee, PLLC; Jae Youn Kim (57) ABSTRACT

The shower includes: a shower body having a lower end connected with a hose for receiving tap water and an upper end connected with a head portion; an ionization apparatus having a pair of protective covers forming the outward appearance of the ionization apparatus and being mounted inside the shower body, a flow passage pipe mounted inside the protective covers, a plurality of permanent magnets mounted on opposite sides of the flow passage pipe and respectively having an end portion being in contact with the flow passage pipe along a longitudinal direction of the flow passage pipe, and magnetic induction frames each having a horizontal portion being in contact with the other end portion of each of the permanent magnets and vertical portions; and a flow control part having a seating hole formed on the outer circumference of the upper portion of the shower body.

19 Claims, 5 Drawing Sheets

(51) Int. Cl.
*F16K 1/22* (2006.01)
*F16K 31/53* (2006.01)

(56) References Cited

U.S. PATENT DOCUMENTS

4,888,113 A * 12/1989 Holcomb ............... 210/222
5,113,751 A * 5/1992 Holcomb et al. ........... 99/286
5,766,461 A * 6/1998 Kampf ................... 210/222
2007/0252022 A1 * 11/2007 Benstead ............... 239/590.5
2009/0206020 A1 * 8/2009 Lee et al. ............... 210/222
2009/0308735 A1 * 12/2009 Jo et al. ............... 204/196.02

FOREIGN PATENT DOCUMENTS

KR 10-2000-0054773 A 9/2000
KR 10-2002-0032664 A 5/2002

* cited by examiner

SHOWER WITH IONIZATION APPARATUS

TECHNICAL FIELD

The present invention relates to a shower which ionizes tap water, and more particularly, to a shower with an ionization apparatus, which is mounted therein to generate ionized water beneficial to the human body and can selectively control a flow rate of ionized water.

BACKGROUND ART

Water is a sine qua non of daily life and is something we cannot live without.

Generally, tap water is gathered in a large way, purified and treated through various purification processes, and then, is supplied to households through various pipes.

In this instance, the tap water is exposed to various germs (bacteria or microorganisms) while flowing through the pipes, and hence, the tap water where germs passed through is supplied to the households.

In the case that people drink the tap water, they are safe from various germs because they drink the water after purifying or boiling the water, but when they take a shower or a bath, because they directly use the tap water without any filtering or purification process, in the case that the tap water is polluted, a user's skin is in direct contact with the polluted water and it may cause serious skin diseases.

Moreover, with development of industrials, various rare diseases have been increased, as an example, there is an atopic disease, which is one of various skin diseases, and in this case, doctors advise to always keep the moisturized skin condition and use purified water, which is not harmful to the skin.

Hence, recently, some people use a water softener installed in a bath room for skin care. However, the water softener is useful for skin care because it generates soft water, but does not provide an effect to sterilize various germs and is not useful to cure skin diseases.

Furthermore, the water softener has several problems in that an available space of the bath room decreases because it requires a space for installing the water softener in the bath room, and in that it takes much money to install the water softener in the bath room because the water softener is expensive.

DISCLOSURE

Technical Problem

Accordingly, the present invention has been made in an effort to solve the above-mentioned problems occurring in the prior arts, and it is an object of the present invention to provide a shower with an ionization apparatus, which is mounted in the shower to generate ionized water beneficial to the human body.

Another object of the present invention is to provide a shower with an ionization apparatus, which can selectively control a flow rate of ionized water.

Technical Solution

To achieve the above objects, the present invention provides a shower with an ionization apparatus comprising: a shower body having a lower end connected with a hose for receiving tap water and an upper end connected with a head portion that has a spray plate for spraying the received tap water; an ionization apparatus having a pair of protective covers forming the outward appearance of the ionization apparatus and being mounted inside the shower body, a flow passage pipe that is made of non-ferrous metals and mounted inside the protective covers, the flow passage pipe communicating with the hose for allowing a flow of the tap water into the flow passage pipe to generate ionized water, a plurality of permanent magnets mounted on opposite sides of the flow passage pipe and respectively having an end portion being in contact with the flow passage pipe along a longitudinal direction of the flow passage pipe to thereby create magnetic fields inside the flow passage pipe, and magnetic induction frames each having a horizontal portion being in contact with the other end portion of each of the permanent magnets and vertical portions that are bent and extend from both end portions of the horizontal portion and are in contact with the outer circumferential surface of the flow passage pipe; and a flow control part having a seating hole formed on the outer circumference of the upper portion of the shower body, a scroll that is rotatably seated on the seating hole and has gear teeth formed on the outer circumference thereof, a flow passage opening and closing member having a rotational disc rotatably engaging the gear teeth of the scroll and a damper crossing the rotational disc, the damper selectively opening and closing the flow passage formed inside the shower body to control the flow rate of the ionized water generated while the tap water passes through the ionization apparatus.

Moreover, the permanent magnets are arranged on the opposite sides of the flow passage pipe by a magnetic force of attraction.

Furthermore, a thickness of the permanent magnets is in a range of 3 mm to 6 mm.

Additionally, a width of the flow passage pipe is in a range of 1.5 mm to 3 mm.

In addition, the magnetic induction frames are made of one selected from groups based on iron, nickel and cobalt.

Moreover, the flow passage pipe has a section formed in a rectangular slot shape.

Furthermore, the protective covers respectively include: a plurality of position fixing recesses formed on inner faces thereof, into which the magnetic induction frames are inserted while surrounding the permanent magnets; and support projections formed at both end portions thereof for supporting both ends of the flow passage pipe.

Additionally, the scroll has rotary shafts formed at both ends thereof as the rotating center of the scroll, and the shower body has projections outwardly formed near to the seating holes of the shower body in such a way that the rotary shafts of the scroll are fit thereto.

In addition, the shower body has guide grooves formed on the inner circumferential surface of the upper portion of the flow passage for allowing the rotational disc to be rotatably mounted thereon and for receiving a part of the outer circumference of the rotational disc.

Furthermore, the lower portion of the shower body is filled with resin for sealing the inside of the lower portion of the shower body and for reinforcing intensity of the shower body, and the resin has a guide plane tapered toward an inlet of the ionization apparatus.

Advantageous Effects

As described above, the shower with the ionization apparatus according to the present invention can generate ionized water having various effects through the magnetic force formed by the permanent magnets and sterilize water while tap water passes through the ionization apparatus mounted in the shower.

Additionally, because it can delay or accelerate the flow speed of the tap water, which flows in the ionization apparatus, through the flow control part, the shower can control a sprayed amount of the ionized water and vary the ionization level of the tap water passing through the ionization apparatus, so that the shower can generate various kinds of ionized water.

Moreover, the shower with the ionization apparatus according to the present invention can maximize ionization of the tap water because it can cause a plurality of magnetic fields by means of a pair of the permanent magnets.

MODE FOR INVENTION

Reference will be now made in detail to the preferred embodiment of the present invention with reference to the attached drawings. This preferred embodiment and the attached drawings are provided to enable those skilled in the art to practice the invention, and the technical scope of the present invention is not limited to the embodiment and the drawings.

The present invention provides a shower with an ionization apparatus that is mounted inside the shower to prevent water softening and the proliferation of various bacteria through ionization of tap water and to allow a user to selectively control a flow rate of ionized water.

As shown in FIGS. 1 to 6, the shower 400 having the ionization apparatus 200 includes: a shower body 100 for receiving and spraying tap water; the ionization apparatus 200 for ionizing the tap water; and a flow control part 300 for controlling the flow rate of ionized water.

Figure 1:
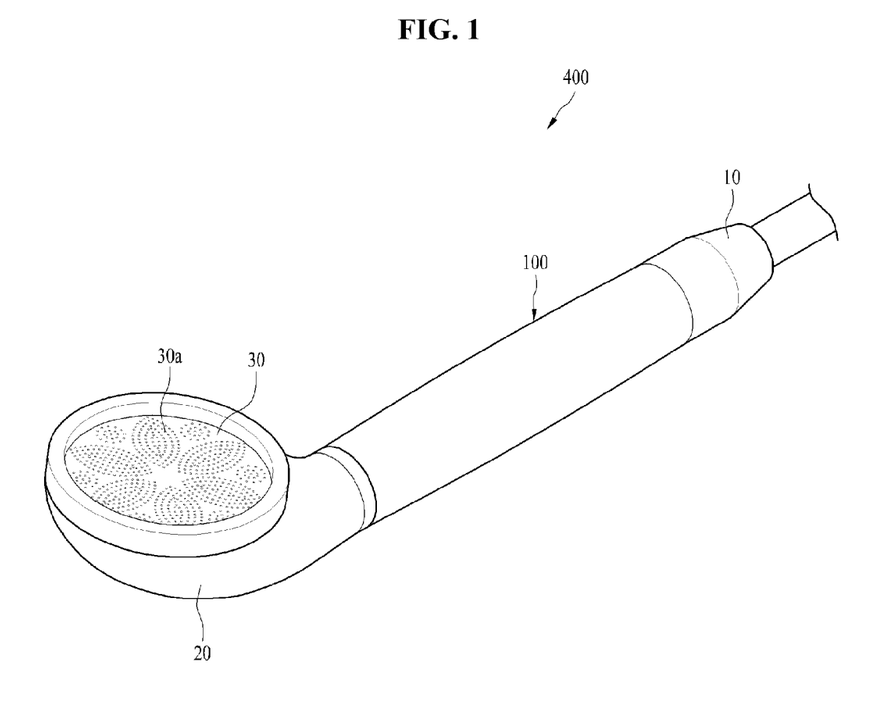
FIG. 1 is a perspective view of a shower with an ionization apparatus according to the present invention.
Figure 2:
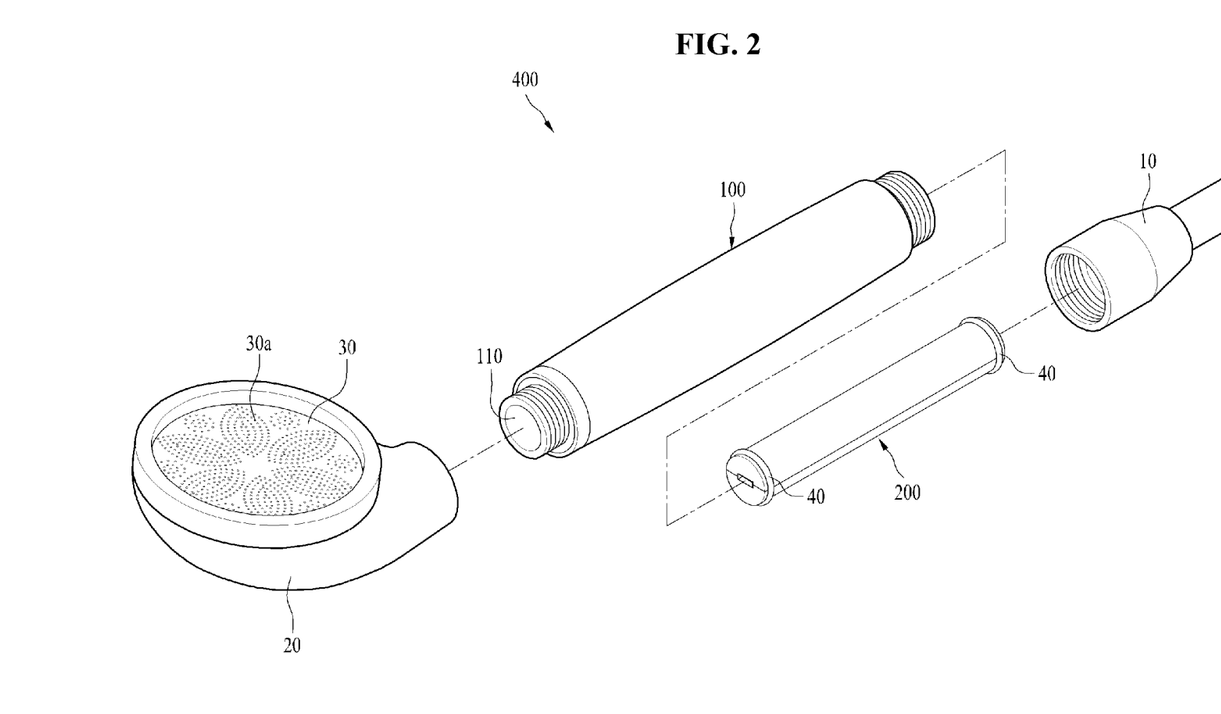
FIG. 2 is an exploded perspective view of FIG. 1.
Figure 3:
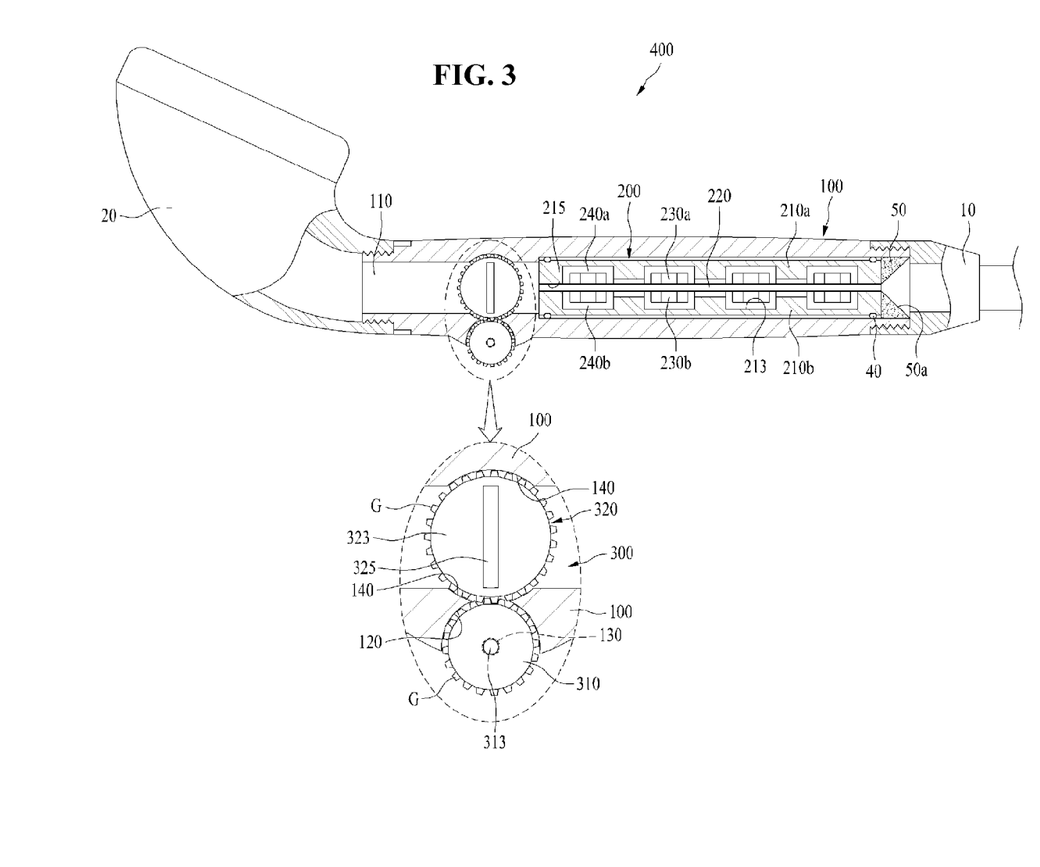
FIG. 3 is a sectional view of essential parts of FIG. 1.

The shower body 100 has a lower end connected with a hose 10 for receiving tap water and an upper end connected with a head portion 20 that has a spray plate 30 for spraying the received tap water.

The shower body 100 is formed in a cylindrical shape and has a flow passage 110 formed inside the shower body 100 for allowing a flow of the tap water provided to the shower body 100.

The hose 10 connected to the lower end of the shower body 100 is screw-coupled with the shower body 100 in such a way that the tap water supplied from a faucet is supplied to the flow passage 110 of the shower body 100, and the shower head portion 20 screw-coupled to the upper end of the shower body 100 sprays water that passes through the shower body 100 and is ionized by the ionization apparatus 200, which will be described later.

In this instance, the spray plate 30 is mounted on the front face of the head portion 20 and has a plurality of spray holes 30a arranged in various spray patterns to form a predetermined water spray radius.

It is preferable that each of the spray holes 30a has an inclined plane formed in such a way that its diameter gets smaller toward the outside of the shower 400 to thereby spray the ionized water far.

Next, the ionization apparatus 200 is mounted inside the shower body 100 to generate ionized water by ionizing the tap water.

Figure 4:
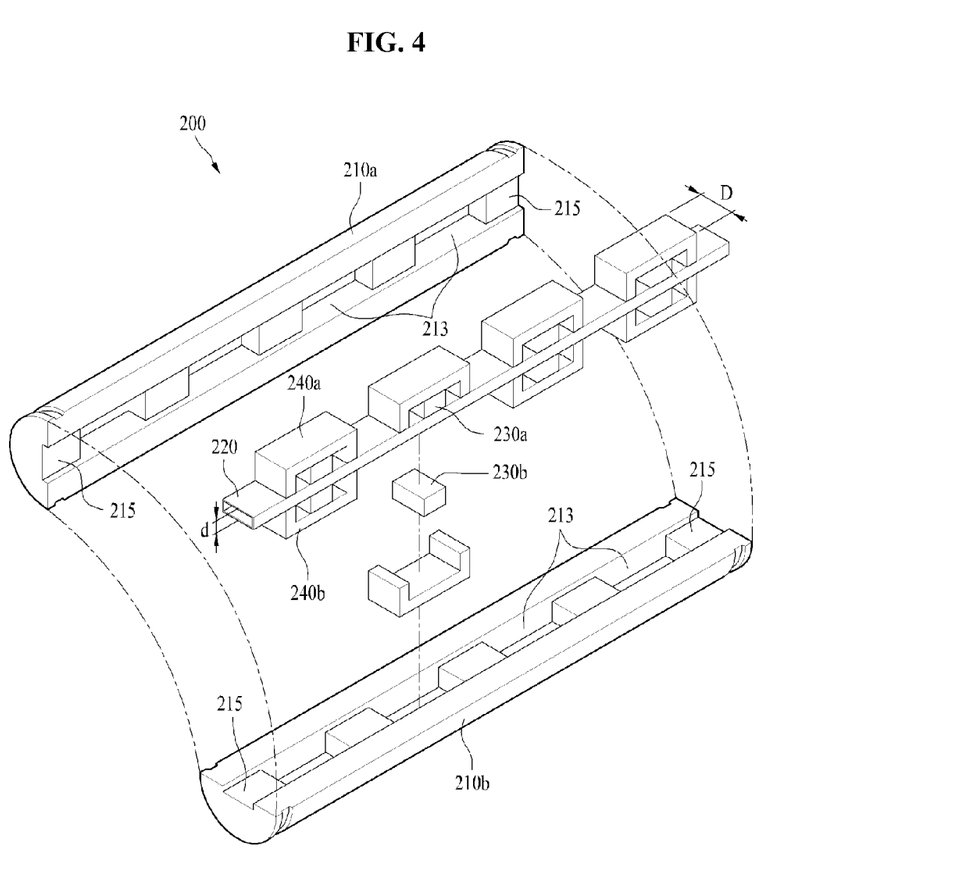
FIG. 4 is an exploded perspective view of the ionization apparatus equipped in the shower according to the present invention.
Figure 5:
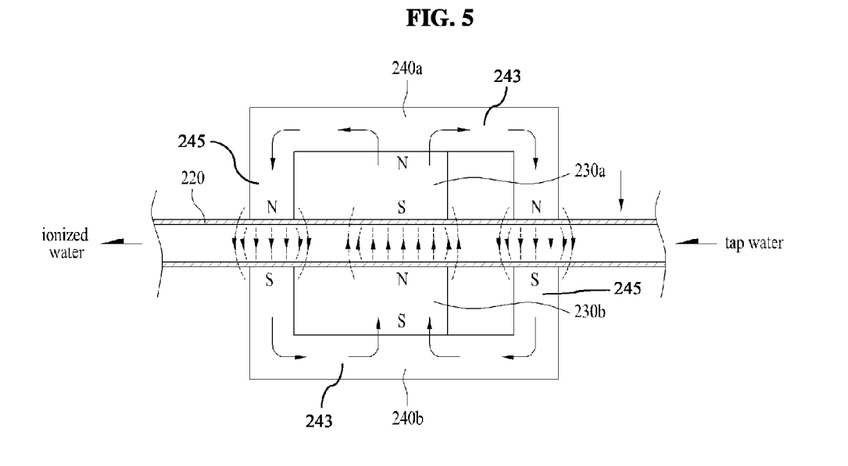
FIG. 5 is a partially sectional view illustrating a state where magnetic force is caused by a plurality of permanent magnets of the ionization apparatus mounted in the shower.

Referring to FIGS. 3 to 5, the ionization apparatus 200 includes: a pair of protective covers 210a and 210b forming the outward appearance of the ionization apparatus 200 and being mounted inside the shower body 100; a flow passage pipe 220 that is made of non-ferrous metals and mounted inside the protective covers 210a and 210b, the flow passage pipe 220 communicating with the hose 10 for allowing a flow of the tap water into the flow passage pipe 220 to generate ionized water; a plurality of permanent magnets 230a and 230b mounted on opposite sides of the flow passage pipe 220 and respectively having an end portion being in contact with the flow passage pipe 220 along a longitudinal direction of the flow passage pipe 220 to thereby create magnetic fields inside the flow passage pipe 220; and magnetic induction frames 240a and 240b each having a horizontal portion 243 being in contact with the other end portion of each of the permanent magnets 230a and 230b and vertical portions 245 that are bent and extend from both end portions of the horizontal portion 243 and are in contact with the outer circumferential surface of the flow passage pipe 220.

The protective covers 210a and 210b form the outward appearance of the ionization apparatus 200 in a state where they accommodate the flow passage pipe 220, the permanent magnets 230a and 230b and the magnetic induction frames 240a and 240b therein, and is formed in a cylindrical shape.

Moreover, the protective covers 210a and 210b are provided as a pair in order to provide easiness in assembly and disassembly, and O-rings 40 for positioning the protective covers 210a and 210b and preventing movement of the protective covers 210a and 210b when the protective covers 210a and 210b are assembled with each other and mounted in the flow passage 110 of the shower body 100 are joined to both end portions of the protective covers 210a and 210b.

The flow passage pipe 220 has a section formed in a rectangular slot shape and is made of non-ferrous metals.

The flow passage pipe 220 has the rectangular slot shape in order to stably support the permanent magnets 230a and 230b which are in contact with the flow passage pipe 220 and to uniformly ionize the tap water flowing in the passage pipe 220 by uniformalizing the magnetic field caused by the permanent magnets 230a and 230b.

Furthermore, because the flow passage pipe 220, which is made of the non-ferrous metals, is not influenced and magnetized by the magnetic field formed by the permanent magnets 230a and 230b, it can prevent a leakage of magnetic flux of the permanent magnets 230a and 230b to thereby increase a magnetic flux density.

The permanent magnets 230a and 230b form the magnetic field inside the flow passage pipe 220 in a state where the end portions of the permanent magnets 230a and 230b are in contact with the outer circumferential surface of the flow passage pipe 220, so that water molecules of the tap water flowing in the flow passage pipe 220 are ionized and atomized.

It is preferable that the permanent magnets 230a and 230b are arranged on the opposite sides of the flow passage pipe 220 by a magnetic force of attraction in order to form. the magnetic fields inside the flow passage pipe 220, and in more detail, are vertically opposed. on the outer circumferential surface of the flow passage pipe 220.

In this instance, because the permanent magnets 230a and 230b are opposed to each other in such a way as to have different polarity from each other to cause gravity, one of the N-S polarity and the S-N polarity may be selected and used.

A plurality of the permanent magnets 230a and 230b arranged as the above are mounted along the longitudinal direction of the flow passage pipe 220, and the number of the permanent magnets 230a and 230b is not restricted because it may be changed according to the length of the flow passage pipe 220.

In the meantime, it is preferable that a thickness (D) of the permanent magnets 230a and 230b is in a range of 3 mm to 6 mm.

In this instance, it is preferable that a width (d) of the flow passage pipe 220 is in a range of 1.5 mm to 3 mm.

If the thickness (D) of the permanent magnets 230a and 230b is less than 3 mm, processability of the permanent magnets 230a and 230b is not good. On the other hand, if the thickness (D) of the permanent magnets 230a and 230b is more than 6 mm, because the volume of the permanent magnets 230a and 230b increases, the volume of the ionization apparatus 200 also increases in proportion to the increase in volume of the permanent magnets 230a and 230b, and hence, it causes an increase of manufacturing costs.

Additionally, if the width (d) of the flow passage pipe 220 is less than 1.5 mm, it may cause maximization of flux density as a distance between the poles of the permanent magnets 230a and 230b decreases, but the supplied tap water cannot flow smoothly. In other hand, if the width (d) of the flow passage pipe 220 is more than 3 mm, the supplied tap water can flow smoothly, but the distance between the poles of the permanent magnets 230a and 230b increases and it causes a decrease of a flux density rate.

Accordingly, the flux density of the permanent magnets 230a and 230b is maximized in the case that the thickness (D) of the permanent magnets 230a and 230b is in the range of 3 mm to 6 mm and the width (d) of the flow passage pipe 220 is in the range of 1.5 mm to 3 mm.

The magnetic induction frames 240a and 240b are respectively mounted on upper and lower portions of the outer circumferential surface of the flow passage pipe 220 while surrounding the permanent magnets 230a and 230b.

The magnetic induction frames 240a and 240b are generally in the form of a "⊓" shape, and each of the magnetic induction frames 240a and 240b includes: one horizontal portion 243 which is in contact with the end portion of each of the permanent magnets 230a and 230b; and two vertical portions 245 bent and extending from both end portions of the horizontal portion 243 in integration with the both end portions of the horizontal portion 243, the vertical portions 245 being in contact with the upper and lower portions of the outer circumferential surface of the flow passage pipe 220.

It is preferable that the magnetic induction frames 240a and 240b are made of one selected from groups based on iron, nickel and cobalt, which have ferromagnetic substances for inducing lines of magnetic force formed by the permanent magnets 230a and 230b.

In the above case, as shown in FIG. 5, the magnetic induction frames 240a and 240b respectively are magnetized due to the lines of magnetic force induced from the permanent magnets 230a and 230b to the magnetic induction frames 240a and 240b because the horizontal portions 243 of the magnetic induction frames 240a and 240b are respectively in contact with the permanent magnets 230a and 230b, and hence, the magnetic field is formed at the end portions of the two vertical portions 245. (See the arrow line of FIG. 5)

In this instance, the end portions of the vertical portions 245 have different polarity from the end portions of the permanent magnets 230a and 230b, which are in contact with the flow passage pipe 220. The reason is that the lines of magnetic force radiated from the permanent magnets 230a and 230b induce magnetism to the magnetic substance.

Accordingly, when the magnetic induction frames 240a and 240b are located on the upper and lower portions of the outer circumferential surface of the flow passage pipe 220 while surrounding the permanent magnets 230a and 230b, they contact with are fixed to the outer circumferential surface of the flow passage pipe 220 while forming the magnetic field inside the flow passage pipe 220 through the gravity action of the poles formed on the end portions of the vertical portions 245.

Finally, two magnetic fields are additionally formed inside the flow passage pipe 220 by the magnetic induction frames 240a and 240b. Therefore, a number of combination structures of the magnetic induction frames 240a and 240b and the permanent magnets 230a and 230b, each of which has three magnetic fields, are arranged on the flow passage pipe 220.

Because a pair of the permanent magnets 230a and 230b mounted in the flow passage pipe 220 forms total three magnetic fields, in the case that a plurality of the permanent magnets 230a and 230b are mounted, the flux density is uniformly formed in the flow passage pipe 220, and ionization of the tap water flowing in the flow passage pipe 220 is maximized, and hence, it causes a uniform ionization.

Meanwhile, it is preferable that a pair of the protective covers 210a and 210b respectively include: a plurality of position fixing recesses 213 formed on inner faces thereof, into which the magnetic induction frames 240a and 240b are inserted while surrounding the permanent magnets 230a and 230b; and support projections 215 formed at both end portions thereof for supporting both ends of the flow passage pipe 220.

The fixing recesses 213 are formed on the inner face of the protective covers 210a and 210b for fixing the positions of the magnetic induction frames 240a and 240b in a state where they surround the permanent magnets 230a and 230b to thereby extend the lifespan of the permanent magnets 230a and 230b by preventing movement of the magnetic induction frames 240a and 240b and to always cause the magnetic force at a designated position.

In this instance, it is preferable that the fixing recesses 213 are formed corresponding to the shape of the magnetic induction frames 240a and 240b.

The support projections 215 can support the both ends of the flow passage pipe 220 mounted inside the protective covers 210a and 210b to keep the position of the flow passage pipe 220.

Next, the flow control part 300 is disposed on the upper portion of the shower body 100, so that it can control a flow rate of the ionized water by selectively opening and closing the flow passage 110 formed inside the shower body 100 and vary the level of ionization by delaying or proceeding the speed of ionization when the tap water to be ionized flows inside the ionization apparatus 200.

Figure 6:
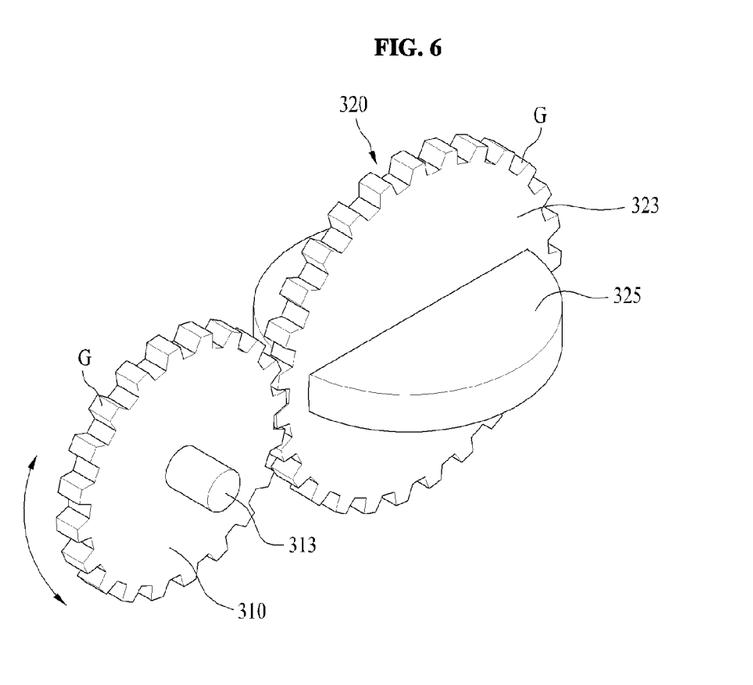
FIG. 6 is a perspective view of a scroll and a flow passage opening and closing member of a flow control part according to the present invention.

Referring to FIGS. 3 and 6, the flow control part 300 includes: a seating hole 120 formed on the outer circumference of the upper portion of the shower body 100; a scroll 310 that is rotatably seated on the seating hole 120 and has gear teeth (G) formed on the outer circumference thereof; a flow passage opening and closing member 320 having a rotational disc 323 rotatably engaging the gear teeth (G) of the scroll 310 and a damper 325 crossing the rotational disc 323, the damper 325 selectively opening and closing the flow passage 110 formed inside the shower body 100 to control the flow rate of the ionized water generated while the tap water passes through the ionization apparatus 200.

The seating hole 120 is formed on the outer circumferential surface of the shower body 100 and opened to receive a part of the scroll 310.

The scroll 310 is formed in a cylindrical shape, has the gear teeth (G) formed along the outer circumference thereof, and is rotatably seated on the seating hole 120.

In this instance, the scroll 310 has rotary shafts 313 formed at both ends thereof for allowing rotation of the scroll 310 in a state where the rotary shafts 313 are seated in the seating holes 120, and the shower body 100 has projections 130 outwardly formed near to the seating holes 120 of the shower body 100 in such a way that the rotary shafts 313 of the scroll 310 are fit thereto.

The flow passage opening and closing member 320 includes the rotational disc 323 mounted in the flow passage 110 formed inside the shower body 100 and the damper 325 for opening and closing the flow passage 110 formed inside the shower body 100 through the rotation of the rotational disc 323.

The rotational disc 323 has a predetermined thickness, is formed in a circular plate type, and has the gear teeth (G) formed on the outer circumference thereof and engaging the gear teeth (G) of the scroll 310.

The rotational disc 323 is rotated by receiving a rotational force of the scroll 310 because it engages the gear teeth (G) of the scroll 310.

The damper 325 is formed on opposite sides of the center of the rotational disc 323 bilaterally to cross the rotational disc 323. In this instance, it is preferable that the damper 325 has a shape corresponding to a diameter of the flow passage 110 of the shower body 100.

The reason is to smoothly control opening and closing of the flow passage 110 through the damper 325 by the user's selection when the damper 325 is rotated by the rotation of the rotational disc 323.

In the meantime, it is preferable that the shower body 100 has guide grooves 140 formed on the inner circumferential surface of the upper portion of the flow passage 110 for allowing the rotational disc 323 to be rotatably mounted thereon and for receiving a part of the outer circumference of the rotational disc 323.

The guide grooves 140 are opposed to each other at upper and lower portions of the inner circumferential surface of the flow passage 110 and the upper and lower portions of the outer circumference of the rotational disc 323 are accommodated in the guide grooves 140, so that the guide grooves 140 can support the rotational disc 323 formed on the flow passage 110 and prevent the rotational disc 323 from being separated from the flow passage 110.

Meanwhile, the lower portion of the shower body 100 is filled with resin 50 for sealing the inside of the lower portion of the shower body 100 and reinforcing intensity of the shower body 100.

In this instance, it is preferable that the resin 50 has a guide plane 50a tapered inwardly, so that the tap water supplied from the hose 10 can be smoothly introduced into an inlet of the ionization apparatus 200.

If the resin 50 does not have the guide plane 50a but has a flat surface, water pressure drops and the tap water cannot be supplied smoothly due to the vortex phenomenon caused by the tap water crashed on to the flat surface of the resin 50, and in the case that the shower is used for a long time, intensity of the lower portion of the shower body 100 gets decreased and it may cause cracks and water leakage.

The operation of the shower 400 having the ionization apparatus 200 will be described in more detail as follows.

First, the hose 10 for supplying tap water is connected to the lower end of the shower body 100, in which the ionization apparatus 200 is mounted, and thereby, the tap water can be supplied to the shower body 100.

The tap water supplied through the hose 10 is introduced into the flow passage pipe 220 of the ionization apparatus 200, and in this instance, the structure of water molecules is changed while the tap water flows through the magnetic field formed by the permanent magnets 230a and 230b and the magnetic induction frames 240a and 240b, which are mounted on the outer circumferential surface of the flow passage pipe 220, and hence, the tap water is ionized.

As described above, the tap water is ionized while flowing through the ionization apparatus 200, is charged to the flow passage 110 formed inside the shower body 100, and then, sent to the shower head portion 20.

The tap water introduced into the shower head portion 20 reaches the spray plate 30 mounted in the shower head portion 20, and then, is sprayed to the outside of the shower body 100 through the plural spray holes 30a formed on the spray plate 30.

In this instance, in the case that the user wants to control a flow rate of the ionized water sprayed through the spray plate 30, the user rotates the scroll 310 disposed on the outer circumferential surface of the shower body 100 to control the flow rate of the ionized water.

In this instance, the control of the flow rate of the ionized water can be selectively achieved by the rotation of the scroll 310 because the damper 325 is rotated while the rotational disc 323 mounted inside the shower body 100 is continuously rotated by the rotation of the scroll 310.

Even though the scroll 310 is rotated in any one direction, the flow rate of the ionized water can be controlled. Furthermore, in the case that the user wants to stop the spray of the ionized water, the user rotates the scroll 310 in such a way that the damper 325 is at right angles to the flow passage 110 of the shower body 100, and then, the spray of the ionized water is stopped.

The attached drawings of the present invention illustrate that the ionization apparatus 200 is mounted inside the shower 400, but the ionization apparatus 200 may be mounted inside the faucet (not shown), which discharges tap water.

As described above, the shower 400 having the ionization apparatus 200 mounted therein can ionize and sterilize the tap water flowing inside the shower 400, and hence, it is good for skin care.

Moreover, the shower 400 having the ionization apparatus 200 can selectively control the flow rate of the ionized water to thereby provide convenience in use.

While the present invention has been described with reference to the particular illustrative embodiment, it is to be appreciated that those skilled in the art can change or modify the embodiment without departing from the scope and spirit of the present invention.

For instance, the number and arrangement methods of the permanent magnets 230a and 230b and the magnetic induction frames 240a and 240b, thickness (D) of the permanent magnets 230a and 230b, width (d) of the flow passage pipe 220, materials and shapes of the magnetic induction frames 240a and 240b, shapes of the flow passage pipe 220, shapes and joining methods of the scroll 310, fixing methods of the rotational disc 323, shapes of the damper 325, and so on cannot be criteria to define the technical scope of the present invention, and the present invention is restricted only by the appended claims.

| [Explanation of essential reference numerals in drawings] | |
| --- | --- |
| 10: hose | 20: shower head portion |
| 30: spray plate | 30a: spray hole |
| 40: O-ring | 50: resin |
| 50a: guide plane | 100: shower body |
| 110: flow passage | 120: seating hole |
| 130: projection | 140: guide groove |
| 200: ionization apparatus | |
| 210a, 210b: protective cover | |
| 213: fixing recess | 215: support projection |
| 220: flow passage pipe | |
| 230a, 230b: permanent magnet | |
| 240a, 240b: magnetic induction frame | |
| 243: horizontal portion | |
| 245: vertical portion | 300: flow control part |
| 310: scroll | 313: rotary shaft |
| 320: flow passage opening and closing member | |
| 323: rotational disc | |
| 325: damper | 400: shower |
| D: thickness | d: width |
| G: gear teeth | |

The invention claimed is:

1. A shower comprising:

a shower body having a lower end connected with a hose for receiving tap water and an upper end connected with a head portion that has a spray plate for spraying the received tap water;

an ionization apparatus including:

a pair of protective covers forming an outward appearance of the ionization apparatus and being mounted inside the shower body;

a flow passage pipe that is made of non-ferrous metals and mounted inside the protective covers, the flow passage pipe communicating with the hose for allowing a flow of the tap water into the flow passage pipe to generate ionized water;

a plurality of permanent magnets mounted on opposite sides of the flow passage pipe, each of the plurality of permanent magnets having an end portion being in contact with the flow passage pipe along a longitudinal direction of the flow passage pipe to thereby create magnetic fields inside the flow passage pipe; and magnetic induction frames each having a horizontal portion being in contact with another end portion of each of the permanent magnets and vertical portions that are bent and extend from both end portions of the horizontal portion and are in contact with an outer circumferential surface of the flow passage pipe; and a flow control part including:

a seating hole formed on an outer circumference of an upper portion of the shower body;

a scroll that is rotatably seated on the seating hole and has gear teeth formed on the outer circumference thereof, wherein at least a part of the scroll and the gear teeth of the scroll are disposed on the outer circumferential surface of the shower body;

a flow passage opening and closing member having a rotational disc rotatably engaging directly the gear teeth of the scroll and a damper formed on opposite sides of the center of the rotational disc bilaterally to cross the rotational disc, the damper selectively opening and closing the flow passage formed inside the shower body to control a flow rate of the ionized water generated while the tap water passes through the ionization apparatus.

2. The shower having the ionization apparatus according to claim 1, wherein the permanent magnets are arranged on the opposite sides of the flow passage pipe by a magnetic force of attraction.

3. The shower having the ionization apparatus according to claim 1, wherein a thickness of the permanent magnets is in a range of 3 mm to 6 mm.

4. The shower having the ionization apparatus according to claim 1, wherein a width of the flow passage pipe is in a range of 1.5 mm to 3 mm.

5. The shower having the ionization apparatus according to claim 1, wherein the magnetic induction frames are made of one selected from groups based on iron, nickel and cobalt.

6. The shower having the ionization apparatus according to claim 1, wherein the protective covers respectively comprise: a plurality of position fixing recesses formed on inner faces thereof, into which the magnetic induction frames are inserted while surrounding the permanent magnets; and support projections formed at both end portions thereof for supporting both ends of the flow passage pipe.

7. The shower having the ionization apparatus according to claim 1, wherein the scroll has rotary shafts formed at both ends thereof as the rotating center of the scroll, and the shower body has projections outwardly formed near to the seating holes of the shower body in such a way that the rotary shafts of the scroll are fit thereto.

8. The shower having the ionization apparatus according to claim 1, wherein the shower body has guide grooves formed on the inner circumferential surface of the upper portion of the flow passage for allowing the rotational disc to be rotatably mounted thereon and for receiving a part of the outer circumference of the rotational disc.

9. The shower having the ionization apparatus according to claim 1, wherein the lower portion of the shower body is filled with resin for sealing the inside of the lower portion of the shower body and for reinforcing intensity of the shower body, and the resin has a guide plane tapered toward an inlet of the ionization apparatus.

10. The shower having the ionization apparatus according to claim 2, wherein a thickness of the permanent magnets is in a range of 3 mm to 6 mm.

11. The shower having the ionization apparatus according to claim 2, wherein a width of the flow passage pipe is in a range of 1.5 mm to 3 mm.

12. The shower having the ionization apparatus according to claim 2, wherein the magnetic induction frames are made of one selected from groups based on iron, nickel and cobalt.

13. The shower having the ionization apparatus according to claim 2, wherein the protective covers respectively comprise: a plurality of position fixing recesses formed on inner faces thereof, into which the magnetic induction frames are inserted while surrounding the permanent magnets; and support projections formed at both end portions thereof for supporting both ends of the flow passage pipe.

14. The shower having the ionization apparatus according to claim 2, wherein the scroll has rotary shafts formed at both ends thereof as the rotating center of the scroll, and the shower body has projections outwardly formed near to the seating holes of the shower body in such a way that the rotary shafts of the scroll are fit thereto.

15. The shower having the ionization apparatus according to claim 2, wherein the shower body has guide grooves formed on the inner circumferential surface of the upper portion of the flow passage for allowing the rotational disc to be rotatably mounted thereon and for receiving a part of the outer circumference of the rotational disc.

16. The shower having the ionization apparatus according to claim 2, wherein the lower portion of the shower body is filled with resin for sealing the inside of the lower portion of the shower body and for reinforcing intensity of the shower body, and the resin has a guide plane tapered toward an inlet of the ionization apparatus.

17. The shower having the ionization apparatus according to claim 1, wherein the flow passage pipe has a section formed in a rectangular slot shape and the permanent magnets are arranged on the opposite sides of the flow passage pipe so that the permanent magnets are in contact with the flow passage pipe.

18. A shower comprising:
a shower body having a lower end connected with a hose for receiving tap water and an upper end connected with a head portion that has a spray plate for spraying the received tap water;
an ionization apparatus including:
  a pair of protective covers forming an outward appearance of the ionization apparatus and being mounted inside the shower body;
  a flow passage pipe that is made of non-ferrous metals and mounted inside the protective covers, the flow passage pipe communicating with the hose for allowing a flow of the tap water into the flow passage pipe to generate ionized water;
  a plurality of permanent magnets mounted on opposite sides of the flow passage pipe, each of the plurality of permanent magnets having an end portion being in contact with the flow passage pipe along a longitudinal direction of the flow passage pipe to thereby create magnetic fields inside the flow passage pipe; and
  magnetic induction frames each having a horizontal portion being in contact with another end portion of each of the permanent magnets and vertical portions that are bent and extend from both end portions of the horizontal portion and are in contact with an outer circumferential surface of the flow passage pipe; and
a flow control part including:
  a seating hole formed on an outer circumference of an upper portion of the shower body;
  a scroll that is rotatably seated on the seating hole and has gear teeth formed on the outer circumference thereof, wherein at least a part of the scroll and the gear teeth of the scroll are disposed on the outer circumferential surface of the shower body;
  a flow passage opening and closing member having a rotational disc rotatably engaging directly the gear teeth of the scroll and a damper formed on opposite sides of the center of the rotational disc, the damper selectively opening and closing the flow passage formed inside the shower body to control a flow rate of the ionized water generated while the tap water passes through the ionization apparatus,
  wherein the damper has a shape corresponding to a diameter of the flow passage of the shower body,
  wherein the permanent magnets are arranged on the opposite sides of the flow passage pipe by a magnetic force of attraction,
  wherein a thickness of the permanent magnets is in a range of 3 mm to 6 mm, wherein a width of the flow passage pipe is in a range of 1.5 mm to 3 mm, and wherein the magnetic induction frames are made of one of iron, nickel and cobalt.

19. A shower comprising:
a shower body having a lower end connected with a hose for receiving tap water and an upper end connected with a head portion that has a spray plate for spraying the received tap water;
an ionization apparatus including:
  a pair of protective covers forming an outward appearance of the ionization apparatus and being mounted inside the shower body;
  a flow passage pipe that is made of non-ferrous metals and mounted inside the protective covers, the flow passage pipe communicating with the hose for allowing a flow of the tap water into the flow passage pipe to generate ionized water;
  a plurality of permanent magnets mounted on opposite sides of the flow passage pipe, each of the plurality of permanent magnets having an end portion being in contact with the flow passage pipe along a longitudinal direction of the flow passage pipe to thereby create magnetic fields inside the flow passage pipe; and
  magnetic induction frames each having a horizontal portion being in contact with another end portion of each of the permanent magnets and vertical portions that are bent and extend from both end portions of the horizontal portion and are in contact with an outer circumferential surface of the flow passage pipe; and
a flow control part including:
  a seating hole formed on an outer circumference of an upper portion of the shower body;
  a scroll that is rotatably seated on the seating hole and has gear teeth formed on the outer circumference thereof, wherein at least a part of the scroll and the gear teeth of the scroll are disposed on the outer circumferential surface of the shower body;
  a flow passage opening and closing member having a rotational disc rotatably engaging directly the gear teeth of the scroll and a damper crossing the rotational disc, the damper selectively opening and closing the flow passage formed inside the shower body to control a flow rate of the ionized water generated while the tap water passes through the ionization apparatus.

* * * * *